US010033209B2

United States Patent
Nakayama et al.

(10) Patent No.: US 10,033,209 B2
(45) Date of Patent: Jul. 24, 2018

(54) PORTABLE ELECTRONIC EQUIPMENT

(71) Applicant: TEAC Corporation, Tokyo (JP)

(72) Inventors: Mikio Nakayama, Kanagawa-Ken (JP);
Takayuki Honda, Tokyo (JP);
Kunihiro Oribe, Chiba-ken (JP)

(73) Assignee: TEAC Corporation, Tokyo (JP)

( * ) Notice: Subject to any disclaimer, the term of this patent is extended or adjusted under 35 U.S.C. 154(b) by 115 days.

(21) Appl. No.: 14/874,060

(22) Filed: Oct. 2, 2015

(65) Prior Publication Data

US 2016/0099597 A1 Apr. 7, 2016

(30) Foreign Application Priority Data

Oct. 3, 2014 (JP) ................. 2014-205099

(51) Int. Cl.
*B23K 11/24* (2006.01)
*H02J 7/00* (2006.01)

(52) U.S. Cl.
CPC .......... *H02J 7/0052* (2013.01); *H02J 7/0047* (2013.01); *H02J 7/0054* (2013.01); *H02J 7/0031* (2013.01); *H02J 2007/0062* (2013.01); *H02J 2007/0067* (2013.01)

(58) Field of Classification Search
CPC ...... H02J 7/0052; H02J 7/0047; H02J 7/0054; H02J 7/0031
USPC ................ 307/112, 116, 125, 126, 130, 131; 713/300, 320, 340; 320/103, 106, 107, 320/111–115
See application file for complete search history.

(56) References Cited

U.S. PATENT DOCUMENTS

| 6,810,481 | B1 | 10/2004 | Kawade et al. |
| 7,424,569 | B2 | 9/2008 | Matsuda |
| 2002/0005707 | A1* | 1/2002 | Kerai ............... G06F 1/266 320/106 |
| 2005/0012830 | A1* | 1/2005 | Pilu ............... H04N 5/232 348/231.99 |
| 2005/0138446 | A1 | 6/2005 | Matsuda |
| 2010/0033018 | A1* | 2/2010 | Fukasawa ........ H02J 7/0036 307/80 |

(Continued)

FOREIGN PATENT DOCUMENTS

| JP | 2001-075682 A | 3/2001 |
| JP | 2006-085248 A | 3/2006 |

(Continued)

*Primary Examiner* — Thomas Skibinski
(74) *Attorney, Agent, or Firm* — Seed IP Law Group LLP

(57) ABSTRACT

Portable electronic equipment which prevents an unwanted decrease in capacity of an internal battery of an external device, such as a smartphone, by cutting off feeding as necessary when connected to the external device, such as the smartphone, through a USB.
The portable electronic equipment has a USB connector for connection with the external device, a feeding switch for turning on or off feeding to the secondary battery through a VBUS line, and a CPU. The CPU subjects the feeding switch to ON-control at all times or OFF-control at all times, or displays a selection menu for selecting feeding or unfeeding when the external device is connected to the USB connector. When a user selects feeding, the feeding switch undergoes ON-control. When the user selects unfeeding, the feeding switch undergoes OFF-control.

6 Claims, 3 Drawing Sheets

(56) References Cited

U.S. PATENT DOCUMENTS

| | | | | |
|---|---|---|---|---|
| 2011/0270955 A1* | 11/2011 | Baldini | ............... | H04N 5/775 709/219 |
| 2012/0303971 A1* | 11/2012 | Palka | ............... | G06F 21/562 713/189 |
| 2013/0049680 A1 | 2/2013 | Katsumata | | |

FOREIGN PATENT DOCUMENTS

| | | |
|---|---|---|
| JP | 4063200 B2 | 3/2008 |
| JP | 2011-139251 A | 7/2011 |
| WO | 2012/077270 A1 | 5/2014 |

\* cited by examiner

PORTABLE ELECTRONIC EQUIPMENT

PRIORITY INFORMATION

This application claims priority to Japanese Patent Application No. 2014-205099 filed on Oct. 3, 2014, which is incorporated herein by reference in its entirety.

BACKGROUND OF THE INVENTION

1. Technical Field

The present invention relates to portable electronic equipment and, more particular to, control feed through a USB.

2. Related Art

In addition to having a data line, a USB (Universal Serial Bus) has a VBUS line. Power can be fed, through the VBUS line, from a host connected with an A plug to a device connected with a B plug.

However, since portable electronic equipment, such as a smartphone and portable headphone amplifying equipment, operates on a built-in secondary battery, it is generally not preferably even for the host connected with the A plug to perform feeding.

JP 2006-085248 A describes a portable device having a USB host function, wherein feeding from a portable device to a device is stopped when the device which operates on bus power is connected to the portable device while the portable device is operating on an internal power source.

JP 4063200 B describes the following. A packet for requesting replacement of VBUS feeding is transmitted from an electronic device connected with an A plug of a USB to another electronic device connected with a B plug of the USB. When an acknowledgement packet is received from the electronic device connected with the B plug, feeding from the electronic device connected with the A plug is stopped.

Incidentally, when an external device, such as a smartphone, is connected with an electronic device, such as portable headphone amplifying equipment, through an OTG (USB On The Go) cable, the smartphone works as a host, and the portable headphone amplifying equipment works as a device, because the OTG cable has a function of converting the B plug into the A plug. The smartphone feeds electric power to the portable headphone amplifying equipment.

However, the smartphone has a problem of being difficult to use for a long period on an internal battery. In the present state in which long-hour continuous operation of the smartphone has become a great technical challenge, inconvenience is encountered in feeding power from the smartphone in many cases.

A conceivable configuration for this case is to shut off feeding through the BVUS at all times when the portable headphone amplifying equipment detects connection of an external device to a USB connector. However, when the portable headphone amplifying equipment is connected to the personal computer rather than to the smartphone, it may be preferable to actively feed power from the personal computer to charge the internal secondary battery. Hence, user's convenience may be deteriorated if feeding is interrupted indiscriminately.

In the related art, the smartphone controls feeding. Control application compatible with specifications of the device must be installed in the smartphone, or control application compatible with the smartphone must be installed in the device, which incurs expenses. There is also apprehension that a load on the CPU or memory may increase with an increasing number of resident applications in the smartphone.

Also, some known types of smartphones do not automatically feed power even when connected to the portable headphone amplifying equipment. However, a special protocol must be installed in the smartphones of the types. Moreover, other types of smartphones automatically feed power. Therefore, it is desirable for the portable headphone amplifying equipment to easily control feeding without regard to kinds or types of external devices connected.

SUMMARY

The present invention provides a flexible portable electronic equipment capable of preventing an unwanted decrease in capacity of an internal battery of an external device, such as a smartphone, as necessary without increasing a load on the external device when connected to the external device and allowing feeding from a computer when connected to the computer.

Portable electronic equipment of the present invention includes a USB connector for connection with an external device; a secondary battery; a feeding switch for turning on or off feeding to the secondary battery through a VBUS line; and a control section which displays a selection menu for selecting either feeding or unfeeding when the external device is connected to the USB connector, performs feeding to the secondary battery from the external device by subjecting the feeding switch to ON-control when a user selects feeding, and performs unfeeding to the secondary battery from the external device by subjecting the feeding switch to OFF-control when the user selects unfeeding.

In one embodiment of the present invention, the portable electronic equipment further includes an operating section for setting the feeding switch to an OFF position at all times.

In another embodiment of the present invention, the portable electronic equipment further includes an operating section for setting the feeding switch to an ON or OFF position at all times. Moreover, the control section monitors the remaining power level of the secondary battery and automatically switches the feeding switch to ON-control when detecting that a remaining power level has become a preset level or less. Alternatively, the control section monitors a state of the power switch and automatically switches the feeding switch to ON-control when detecting that the power switch has been turned off.

According to the present invention, it is possible to prevent an unwanted decrease in capacity of an internal battery of an external device without increasing a load on the external device by cutting off feeding as necessary when the external device, such as a smartphone, is connected to a USB. Further, when a computer is connected, feeding from the computer is also permissible.

The invention will be more clearly comprehended by reference to the embodiment provided below. However, the embodiment provided below are illustrative, and the scope of the invention is not limited to the embodiments.

BRIEF DESCRIPTION OF THE DRAWINGS

A preferred embodiment of the present invention will be described in detail by reference to the following drawings, wherein.

DETAILED DESCRIPTION

By reference to the drawings, an embodiment of the present invention is hereunder described by taking as an example a portable headphone amplifying equipment 1 with a built-in SD player. The portable headphone amplifying equipment 1 is a device which is connected to the smartphone and another device; which converts a digital audio signal input from the portable device by means of a D/A converter; and which outputs the signal from a headphone terminal after amplifying the signal by a high-quality amplifier. The SD player is a device which plays back the digital audio signal stored in an SD card and outputs the signal. The portable headphone amplifying equipment of the present embodiment is a device which implements the two functions. The embodiments provided below are illustrative, and the present invention is not limited to the following embodiments.

Figure 1:
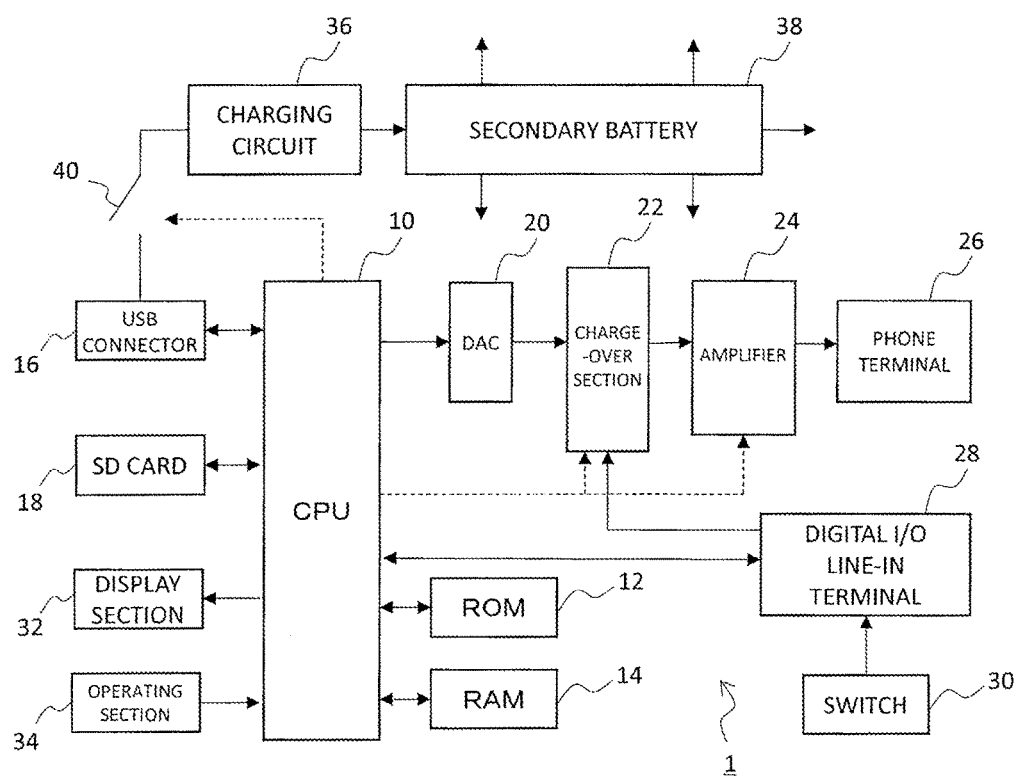
FIG. 1 is a configuration block diagram of an embodiment.

FIG. 1 is a configuration block diagram of the portable headphone amplifying equipment of the embodiment. The portable headphone amplifying equipment 1 has a CPU 10, ROM 12, RAM 14, a USB connector 16, an SD card 18, a DAC (D/A converter) 20, a changeover section 22, an amplifier 24, a PHONE (headphone) terminal 26, a DIGITAL I/O LINE-IN terminal 28, a switch 30, a display section 32, an operating section 34, a charging circuit 36, a secondary battery 38, and a feeding switch 40.

Pursuant to the program stored in the ROM 12, the CPU 10 performs predetermined processing (system control, processing of various signals, and others) by using the RAM 14 as working memory.

The USB connector 16 is a connector for connection with a portable device, such as a smartphone, and a personal computer.

The SD card 18 stores digital audio data.

When a portable device, such as a smartphone, is connected to the USB connector 16 and when a digital audio signal is received, the CPU 10 outputs the digital audio signal to the DAC 20. When an SD player function is selected by means of operation entered by way of an unillustrated operating section, a digital audio signal stored in the SD card 18 is read and output to the DAC 20.

The DAC 20 processes the digital audio signal, converts the signal into an analog audio signal, and outputs the analog audio signal to the changeover section 22. In this regard, the DAC 20 can also convert a so-called high-resolution sound source of PCM 24 bits/192 kHz, DSD 128 into the analog audio signal.

The changeover section 22 is made up of a plurality of changeover contact points, and delivers an output from the DAC 20 to the amplifier 24 or switches the audio signal input from the DIGITAL I/O LINE-IN terminal 28 to the amplifier 24. Switching of the changeover section 22 is controlled by a control signal (designated by a broken line in the drawing) from the CPU 10.

The amplifier 24 amplifies the audio signal output from the changeover section 22 and outputs the thus-amplified signal to the PHONE (headphone) terminal 26. The amplifier 24 amplifies the audio signal by means of, for instance, a push-pull circuit having a discrete configuration. Incidentally, there is also adopted a configuration for making a gain of the amplifier 24 switchable between two levels; a high and a low.

The DIGITAL I/OLINE-IN terminal 28 is a terminal for sharing DIGITAL INPUT (a digital input), DIGITAL OUTPUT (a digital output), and LINE-IN (an analog input). The DIGITAL INPUT also shares a digital optical input and a digital coaxial input. Specifically, the terminal 28 of the present embodiment corresponds to an integration of four input/output terminals: namely, a digital audio optical input, a digital audio coaxial input, an analog audio input, and a digital audio coaxial output, into one terminal.

The switch 30 is a user-operable switch for switching whether to cause the DIGITAL I/O LINE-IN terminal 28 to act as a DIGITAL I/O terminal or a LINE-IN terminal. The switch 30 is configured as; for instance, a slide switch disposed in the vicinity of the DIGITAL I/O LINE-IN terminal 28.

When the switch 30 is switched to the LINE-IN side, the CPU 10 controls the changeover section 22 in response to switching of the switch 30, supplies the analog audio signal input from the DIGITAL I/O LINE-IN terminal 28 to the amplifier 24, and outputs the signal from the PHONE terminal after amplifying the signal with the amplifier 24. Further, when the switch 30 is switched to the DIGITAL I/O side, the CPU 10 displays a selection menu on the display section 32, thereby enabling the user to select either a digital input or a digital output. Selection of the digital input or the digital output can also be set as a regular setting value from the menu hierarchy. When the user selects the digital input, the CPU 10 inputs the digital optical input signal or the digital coaxial input signal entered from the DIGITAL I/O LINE-IN terminal 28, and supplies the thus-selected signal to the amplifier 24. A discrimination is made as to whether the input is the digital optical input or the digital coaxial input by use of discrimination information, such as a difference in impedance characteristic and detection of an optical signal. When the user selects the digital output, the CPU 10 outputs the digital audio signal stored in the SD card 18 to the DIGITAL I/O LINE-IN terminal 28 in accordance with the selection.

Since the DIGITAL I/O LINE-IN terminal 28 has a function of the digital input terminal and the function of the analog input terminal, the DIGITAL I/O LINE-IN terminal 28 can output a high-quality audio signal from the PHONE terminal 26 when connected to another audio equipment having a digital output terminal or another audio equipment not having a digital output terminal.

The operating section 34 sets a state of feeding achieved when the external device is connected to the USB connector 16. In the present embodiment, the user can set any one of three states below.

Normally feeding

Normally unfeeding

Display a selection menu at USB-connection time

In the above, (1) when normally feeding is set, the CPU 10 performs feeding from the external device connected to the USB connector 16. (2) When normally unfeeding is set, the CPU 10 does not perform feeding from the external device connected to the USB connector 16. Moreover, (3) when displaying a selection menu at USB-connection time is set, the CPU 10 pops up the selection menu on the display section 32 upon detection of a USB connection, thus enabling the user to select whether to perform feeding. For instance, two menus "Charge"
"No Charge"

are displayed. When the user selects "Charge" on the selection menu display, feeding from the external device is performed. In the meantime, when the user selects "No Charge," feeding from the external device is not performed.

Therefore, in a case where the portable headphone amplifying equipment 1 is connected with; for instance, a personal computer, in most cases, normally feeding is set. In a case where the portable headphone amplifying equipment 1 is connected with a smartphone, and the like, in most cases, normally unfeeding is set. In a case where the portable headphone amplifying equipments 1 is connected to the personal computer and the smartphone, displaying a selection menu at connection time is previously set, whereby feeding is performed when necessary, but feeding can be interrupted when unnecessary.

The charging circuit 36 charges the secondary battery 38 by feeding a charge current to the secondary battery 38 by use of a VBUS of the cable connected to the USB connector 16.

The secondary battery 38 feeds power to individual sections of the device.

The feeding switch 40 is interposed between the USB connector 16 and the charging circuit 36 and performs ON/OFF control of a charge current flowing through the VBUS. Turning on or off of the feeding switch 40 is controlled by a control signal (designated by a broken line in the drawing) from the CPU 10.

When normally feeding is set by the operating section 34, the CPU 10 performs ON-control of the feeding switch 40 at all times. When normally unfeeding is set from the operating section 34, the feeding switch 40 undergoes OFF-control at all times. Further, when the operating section 34 displays the selection menu at connection time and when "Charge" is selected, the feeding switch 40 is subjected to ON-control. When "No Charge" is selected, the feeding switch 40 is subjected to OFF-control.

Figure 2A:
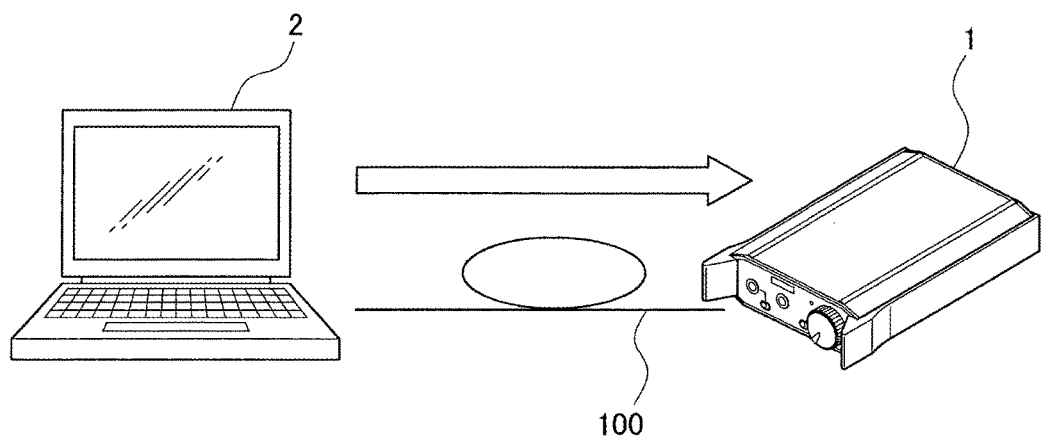
FIG. 2A is an explanatory view of a connection with an external device of the embodiment.
Figure 2B:
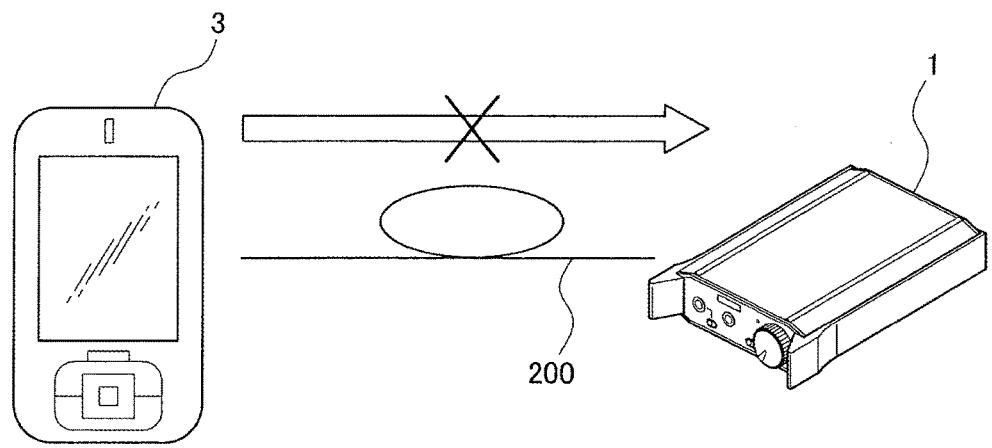
FIG. 2B is an explanatory view of the connection with the external device of the embodiment.

FIG. 2A and FIG. 2B show a case where the portable headphone amplifying equipment 1 is connected to the personal computer 2 and the smartphone 3, respectively.

FIG. 2A shows a case where the portable headphone amplifying equipment 1 and the personal computer 2 are connected through a USB cable 100. The personal computer 2 is taken as a host, and the portable headphone amplifying equipment 1 is taken as a device. Power is fed to the portable headphone amplifying equipment 1 from the personal computer 2 through the VBUS. So long as normally feeding is set by operating the operating section 34, the secondary battery 38 is recharged by power from the personal computer 2. The same also applies to the case where "Charge" is selected on the selection menu.

In the meantime, FIG. 2B shows a case where the portable headphone amplifying equipment 1 and the smartphone 3 are connected through an OTG cable 200. The OTG cable 200 has a function of converting the B plug of the USB into the A plug of the same. In this case, the smartphone 3 becomes the host, and power is fed from the smartphone 3 through the VBUS. However, normally unfeeding is set from the operating section 34, or "No Charge" is selected on the selection menu, whereby the feeding switch 40 is subjected to OFF-control, so that feeding from the smartphone 3 can be interrupted (in the drawing, symbol X designates a state of power shutdown). Even when the digital audio signal from the smartphone 3 is converted and amplified and output from the PHONE terminal 26, an unwanted decrease in capacity of the internal battery of the smartphone 3 can be prevented.

Figure 3:
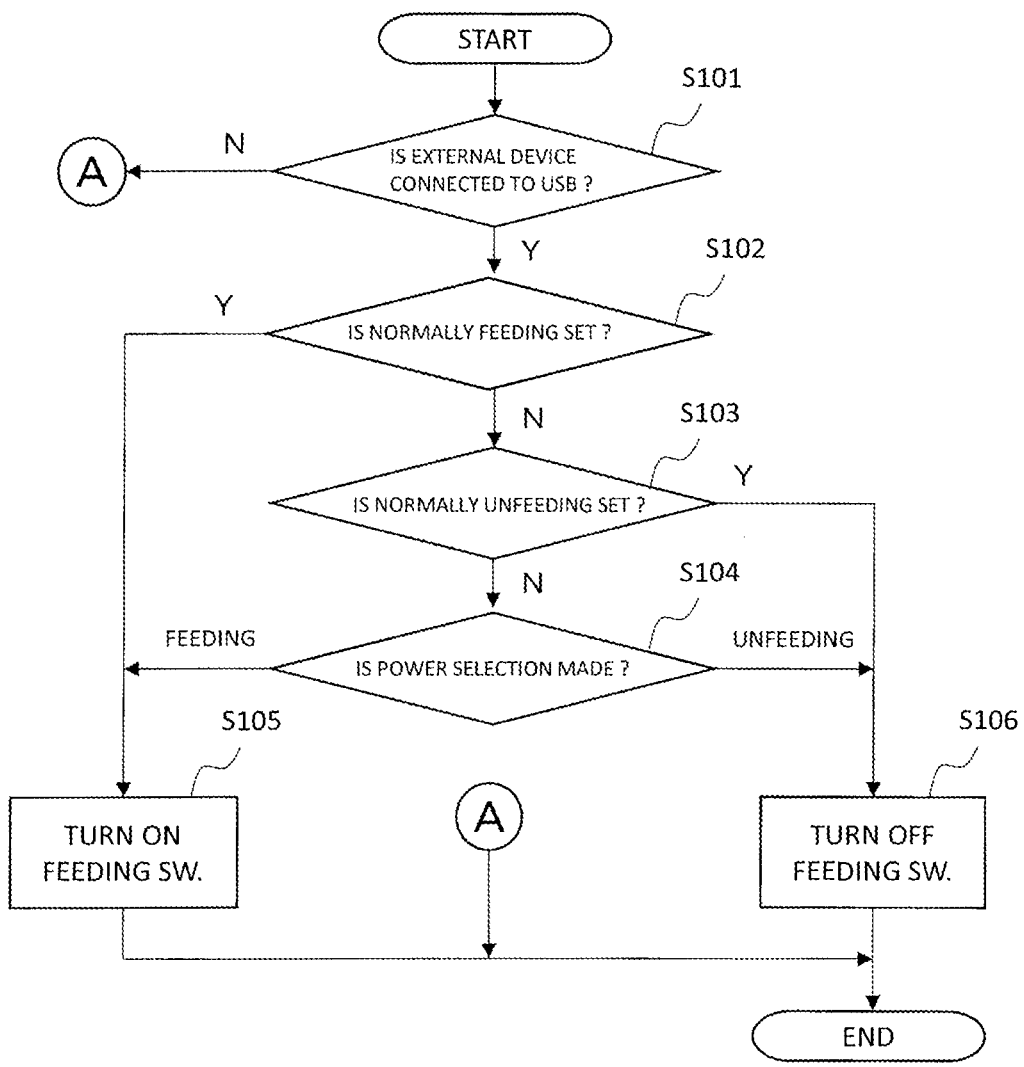
FIG. 3 is a processing flowchart of the embodiment.

FIG. 3 is a processing flowchart of the present embodiment.

First, the CPU 10 determines whether or not the external device is connected to a USB (S101). When the external device is connected to the USB, a determination is made as to whether or not normally feeding is set by the operating section 34 (S102).

When normally feeding is set, the CPU 10 subjects the feeding switch 40 to ON-control (S105). Thereby, feeding from the external device through the VBUS becomes available.

When normally feeding is not set, the CPU 10 determines whether or not normally feeding is set by the operating section 34 (S103).

When normally unfeeding is set, the CPU 10 subjects the feeding switch 40 to OFF-control (S106). Thereby, feeding from the external device through the VBUS is not performed.

When neither normally feeding nor normally unfeeding is set, the CPU 10 displays the selection menu on the display section 32 upon detection of a connection through the USB (S104). When the user selects feeding, such as "Charge," the feeding switch 40 undergoes ON-control (S105). When the user selects unfeeding, such as "No Charge," the feeding switch 40 undergoes OFF-control (S106).

As above, the present embodiment adopt the configuration in which, when connecting the portable headphone amplifying equipment 1 with the external device through the USB, the user can select any of the modes of normally feeding from an external device, normally unfeeding, and selecting either of the two at connection time. Accordingly, feeding can be flexibly controlled according to the external device to be connected.

When the power of the portable headphone amplifying equipment 1 is turned off (the secondary switch 38 becomes exhausted or the power switch is turned off) while the feeding switch 40 undergoes OFF-control, internal settings of the portable headphone amplifying equipment 1 are held in a feed-OFF position, there might occur a case where the secondary battery 38 cannot be charged even when the cable is connected to the USB connector 16. In this case, the secondary battery 38 can be charged by once turning on the power switch and switching the feeding switch 40 to ON-control (this may be unsuccessful when the secondary battery 38 is exhausted, because the power is not turned on even when the power switch is operated) or by charging the secondary battery 38 with its own power by use of an AC adapter. However, in order to make user's convenience much better, the following configuration can also be adopted. In other words, a remaining battery power level of the secondary battery 38 is monitored. When the remaining battery power level of the secondary battery 38 is detected to have come to; for instance, 5% or less (an arbitrary set value taking into account a level which might cause an instable power supply or another level which might stop a power supply). The feeding switch 40 can be automatically switched to ON-control before the power of the portable headphone amplifying equipment 1 fails, or the feeding switch 40 can be automatically switched to ON-control in response to the turning off of the power switch.

The embodiments of the present invention have been described thus far, but the present invention is not limited to the embodiments and susceptible to various modifications.

For instance, the present embodiment, there is adopted the configuration in which the user can select any of normally feeding, normally unfeeding, and selection of feeding/unfeeding at connection time. However, feeding is usually performed when a connection is made to the USB in normal times. In light of this, there can also be adopted a configuration that allows the user to select (2) normally unfeeding or (3) selection of feeding or unfeeding at connection time. Moreover, there can also be adopted a configuration in which only (3) selection of feeding or unfeeding at connection time is available. In this case, upon detection of the USB connection, the CPU 10 shifts from processing pertaining to S101 to S104 in the processing flowchart shown in FIG. 3, thereby displaying on the display section 32 the selection menu as to whether or not to supply power. Until the selection menu is displayed and the user selects any one on the selection menu, it is desirable for the CPU 10 to hold the feeding switch 40 in an OFF-control state.

Moreover, in the present embodiment, it is also possible to implement normally feeding and normally unfeeding by means of a mechanical switch, such as a slide switch, and display on the display section 32 a menu for selecting feeding/unfeeding at connection time. However, there can also be adopted another configuration in which the display section 32 displays the selection menu at the time of startup of the portable headphone amplifying equipment 1 and in which any of select ion menus; namely, normally feeding/normally unfeeding/selection at connection time, is selected on the selection menu. It is desirable to store the selected menu in the ROM 12, such as flash ROM, even after power is turned off.

In the present embodiment, the CPU 10 is configured so as to prompt the user to make a selection by displaying a pop-up menu on the display section 32 upon detection of connection of the external device to the USB when the user selects (3) feeding/unfeeding at connection time. However, the user can display the selection menu on the display section 32 by operating the operating section 34 at the time of occurrence of a USB connection to select either feeding/unfeeding. In this regard, it is laborious for the user to select feeding or unfeeding from the hierarchical menu every time occurrence of the USB connection. Accordingly, it will be preferable that the CPU 10 will automatically pop up the selection menu at the time of the connection.

In the present embodiment, the portable headphone amplifying equipment 1 has a function of charging the secondary battery 38 with an AC power source. When the secondary battery 38 is being actually charged or when the secondary battery 38 has already been fully charged, the CPU 10, needless to say, subjects the feeding switch 40 to OFF-control even if normally feeding or feeding at connection time is selected. In short, the CPU 10 can also perform known control, such as ON/OFF-control of the feeding switch 40 in accordance with a recharged state of the secondary battery 38. Accordingly, the word "normally feeding" in the present embodiment means that feeding starts at all times when the external device is connected to the USB and does not mean that feeding is performed even when feeding from the external device is unnecessary, such as when the secondary battery 38 is fully charged.

In the embodiment, the feeding switch 40 is interposed between the USB connector 16 and the charging circuit 36. However, this is a mere example. The feeding switch 40 may also be incorporated into the charging circuit 36 or interposed between the charging circuit 36 and the secondary battery 38. In other words, the essential requirement is to control feeding to the secondary battery 38 through the VBUS line at any point on the line.

Further, the present embodiment adopts the configuration in which the user makes a selection at connection time in light of the fact that difficulty is encountered in discriminating whether the external device connected through the USB is the computer or the smartphone. Provided that the connected external value can be distinguished, the CPU 10 can control feeding/unfeeding in accordance with a discrimination result. However, even in this case, it is desirable to display a menu "Smartphone is connected. Do you start feeding?," or the like on the display section 32 and perform feeding/unfeeding in response to user's operation.

Moreover, in the present embodiment, the portable headphone amplifying equipment is illustrated as portable electronic equipment. However, the present invention is not limited to the device and applicable to an arbitrary portable electronic equipment that can be connected to the computer and the smartphone through the OTG cable.

What is claimed is:

1. Portable electronic equipment comprising:
   a Universal Serial Bus (USB) connector for connection with an external device;
   a secondary battery;
   a feeding switch which, in operation, turns on or off feeding to the secondary battery through a Virtual Bus (VBUS) line;
   an operating section which, in operation, displays a first selection menu at a time of startup of the portable electronic equipment, the first selection menu enabling setting of an operation mode when the external device is connected to the USB connector, including a mode in which a second selection menu for selecting either feeding or unfeeding is displayed when the external device is connected to the USB connector; and
   a controller which displays the second selection menu for selecting either feeding or unfeeding in response to detecting that the external device is connected to the USB connector in a state where the operation mode set by the first selection menu is the mode in which the second selection menu for selecting either feeding or unfeeding is displayed when the external device is connected to the USB connector, performs feeding to the secondary battery from the external device by subjecting the feeding switch to ON-control when a user selects feeding and the controller detects that a remaining power level of the secondary battery is less than a predetermined level, and performs unfeeding to the secondary battery from the external device by subjecting the feeding switch to OFF-control when the user selects unfeeding and the controller detects that the remaining power level of the secondary battery is greater than the predetermined level,
   wherein the controller makes a determination whether the external device connected through the USB connector is a computer or a smartphone, and causes the second selection menu to display a message including a result of the determination.

2. The portable electronic equipment according to claim 1, wherein the controller performs unfeeding to the secondary battery from the external device by subjecting the feeding switch to OFF-control when detecting that the external device is connected to the USB connector in a state where a mode for setting the feeding switch to an OFF position at all times is set as the operation mode.

3. The portable electronic equipment according to claim 1, wherein the controller performs feeding to the secondary battery from the external device by subjecting the feeding switch to ON-control when detecting that the external device is connected to the USB connector in a state where a mode for setting the feeding switch to an ON position at all times is set as the operation mode, and performs unfeeding to the secondary battery from the external device by subjecting the feeding switch to OFF-control when detecting that the external device is connected to the USB connector in a state where a mode for setting the feeding switch to an OFF position at all times is set as the operation mode.

4. The portable electronic equipment according to claim 1, wherein the controller monitors the remaining power level of the secondary battery and automatically switches the feeding switch to ON-control when detecting that the remaining power level has become a preset level or less.

5. The portable electronic equipment according to claim 1, further comprising:
   a power switch, wherein
   the controller monitors a state of the power switch and automatically switches the feeding switch to ON-control when detecting that the power switch has been turned off.

6. The portable electronic equipment according to claim 1, wherein the portable electronic equipment is portable headphone amplifying equipment.

* * * * *